(12) United States Patent
Tarlow (10) Patent No.: US 8,400,353 B2
(45) Date of Patent: Mar. 19, 2013

(54) APPARATUS AND METHOD FOR USE IN GLOBAL POSITION MEASUREMENTS

(75) Inventor: Ben Tarlow, London (GB)

(73) Assignee: SiGe Semiconductor (Europe) Limited (GB)

( * ) Notice: Subject to any disclaimer, the term of this patent is extended or adjusted under 35 U.S.C. 154(b) by 541 days.

(21) Appl. No.: 12/310,551

(22) PCT Filed: Aug. 31, 2007

(86) PCT No.: PCT/CA2007/001520
§ 371 (c)(1),
(2), (4) Date: Jun. 7, 2010

(87) PCT Pub. No.: WO2008/025151
PCT Pub. Date: Mar. 6, 2008

(65) Prior Publication Data
US 2010/0231445 A1   Sep. 16, 2010

Related U.S. Application Data

(60) Provisional application No. 60/841,216, filed on Aug. 31, 2006.

(51) Int. Cl.
*G01S 19/20* (2010.01)
(52) U.S. Cl. .................................................. 342/357.58
(58) Field of Classification Search ............. 342/357.58, 342/357.59
See application file for complete search history.

(56) References Cited

U.S. PATENT DOCUMENTS

| | | | | |
|---|---|---|---|---|
| 5,557,284 A | * | 9/1996 | Hartman | 342/357.29 |
| 5,663,992 A | | 9/1997 | Farmer | |
| 5,808,581 A | * | 9/1998 | Braisted et al. | 342/357.58 |
| 6,917,644 B2 | | 7/2005 | Cahn et al. | |
| 7,061,425 B2 | | 6/2006 | Geier et al. | |
| 7,450,060 B2 | * | 11/2008 | Strachan | 342/357.29 |
| 7,522,099 B2 | * | 4/2009 | Zhodzishsky et al. | 342/357.24 |
| 2007/0299608 A1 | * | 12/2007 | Ishihara et al. | 701/213 |
| 2008/0169978 A1 | * | 7/2008 | Powell et al. | 342/357.12 |

OTHER PUBLICATIONS

International Search Report, International Application No. PCT/CA2007/001520, Dec. 12, 2007.

* cited by examiner

*Primary Examiner* — Gregory C Issing
(74) *Attorney, Agent, or Firm* — Knobbe Martens Olson & Bear, LLP (57) ABSTRACT

Apparatus and methods are provided for use in a receiver that receives global positioning data from one or more satellites above the Earth's surface. The apparatus and methods involve detecting a change in at least one parameter associated with the receiver and determining if the change in the at least one parameter is to be treated as erroneous. As a result of determining if the change in the at least one parameter is to be treated as erroneous, a further action may be performed. Determining if the change is to be treated as erroneous may include, for example, detecting changes in more than one parameter and determining if the changes are coincident. Detecting a change in at least one parameter may also enable the receiver to predict the presence and magnitude of multipath components of signals, predict changes in an environment local to the receiver, predict large errors in position estimates determined by the receiver and modify an acquisition and tracking strategy used by the receiver.

26 Claims, 6 Drawing Sheets

APPARATUS AND METHOD FOR USE IN GLOBAL POSITION MEASUREMENTS

RELATED APPLICATIONS

This application claims the benefit of and is a National Phase Entry of International Application Number PCT/CA2007/001520 filed Aug. 31, 2007, and claims the benefit of U.S. Provisional Patent Application No. 60/841,216 filed Aug. 31, 2006, which is incorporated herein by reference.

FIELD OF THE INVENTION

The present invention relates to apparatus and methods for measuring global position.

BACKGROUND OF THE INVENTION

The basic functionality of a Global Positioning System (GPS) receiver is determining its position by computing time delays between transmission and reception of signals transmitted from a network of GPS satellites above the earth's surface, which are received by the receiver on or near the surface of the earth. The GPS satellites transmit to the receiver absolute time information associated with the satellite signal. A respective time delay resulting from signal transmission from each of the respective satellites to the receiver is multiplied by the speed of light to determine the distance from the receiver to each of the respective satellites from which data is received. This distance is known as the pseudorange. If fewer than three satellites are used to determine a position, the distance may not be precisely determinable due to an offset between an oscillator in the receiver generating a clock signal for the receiver and the timing signal to which the satellites are synchronized. The GPS satellites also transmit to the receivers satellite-positioning data, generally known as ephemeris data.

The timing signal from each satellite includes a time tag that is used by the receiver to determine when each received signal was transmitted by each respective satellite. By knowing the exact time of transmission of each of the signals, the receiver uses the ephemeris data to calculate where each satellite was when it transmitted a signal. The receiver then combines the knowledge of respective satellite positions with the computed distances to the satellites to determine the receiver's position.

Position calculations generated from satellite signals may use pseudorange measurements, ephemeris data, absolute time of transmission and/or differences in arrival time, from four or more satellites to determine a three dimensional position estimate of the GPS receiver's location, which includes latitude, longitude and altitude. Measurement information from three satellites is needed to determine a two dimensional position estimate of the GPS receiver's location, which includes latitude and longitude.

Other Global Navigation Satellite Systems (GNSS) operate using similar principles as GPS, as described above.

SUMMARY OF THE INVENTION

When a GNSS receiver enters a heavily multipath area from a signal environment in which the receiver is substantially in a direct line of sight with most of the space vehicles (SVs) it is receiving signals from, signals from SVs at low elevation tend to suffer from multipath effects, whereas signals from overhead SVs are less affected. The expression "multipath" in this context refers to a phenomenon in which a transmitted signal is reflected by intervening objects such as mountains, buildings or other structures one or more times before it reaches the GNSS receiver. The reflection(s) cause the path length of the signal to increase in comparison with a direct path, thereby increasing the measured pseudorange. The reflected signal may interfere destructively with the direct path signal, reducing its strength.

According to a first aspect of the invention, there is provided an apparatus for a receiver, the receiver having circuitry configured to receive signals from at least one source providing global positioning information, the apparatus comprising a parameter change detector configured to detect a change in at least one parameter associated with the receiver; and a parameter error determiner configured to determine if the change in the at least one parameter is to be treated as erroneous.

In some embodiments, said parameter change detector is configured to detect a sudden change in said at least one parameter.

In some embodiments, said parameter error determiner is configured to determine if the change is to be treated as erroneous based on at least one of (1) a magnitude of the change, (2) a rate of change and (3) whether or not the change is sudden.

In some embodiments, wherein said parameter error determiner is configured to determine if the change is to be treated as erroneous based on further information. The further information may include any one or more of: a measurement of said parameter at a different time to the detected change; a value for said parameter; a threshold change in the value of said parameter; a measurement of a different parameter at substantially the same time as the detected change, or at a different time; and information that describes one or more aspects of the environment in an area proximate the receiver, when the apparatus is in use. Particular examples of further information may include any one or more of: a position of said receiver determined by at least one of said apparatus and said receiver; a clock offset between the clock of the receiver and the clock of the at least one source; 3) velocity of said receiver; acceleration of said receiver; geometric dilution of precision (GDOP); a number of sources from which the receiver receives signals; a determined pseudorange for a signal received by said receiver; the strength of a signal received by said receiver; a parameter measured by an inertial sensor; a parameter indicative of the presence or absence of a multi-path component of a signal received by said receiver; and a parameter indicative of an aspect of the environment in an area proximate the receiver.

In some embodiments, measurement of said different parameter comprises a measurement of a change in value of said different parameter.

In some embodiments, at least one parameter comprises one or more parameters received, detected by, or determined by at least one of said receiver and said apparatus.

In some embodiments, the apparatus is configured to cause an action if the change in the at least one parameter is to be treated as erroneous. For example, if the change in the at least one parameter is to be treated as erroneous, the action may be performed to mitigate error resulting from the change.

In some embodiments the apparatus is configured to cause at least one of the following actions: search for a direct line of sight signal; modify a weighting value of a signal or discard a signal from one or more sources from which the receiver receives a signal; alter a measured pseudorange; alter a measured pseudorange based on an estimated amount of multipath; provide an indication of the presence of one or more multi-path component(s) of signal(s); one or more of predict, estimate, determine and provide an indication of the magnitude of one or more multi-path component(s) of signal(s); one or more of detect, determine and provide an indication of information on the environment local to the receiver; correct a determined position which was determined based on the at least one parameter having the change; provide an indication of a possible position inaccuracy to a user; one or more of determine and provide an indication of the magnitude of an error in one or more parameters; one or more of control and modify a strategy for one or more of acquiring and tracking signal(s) transmitted from one or more source; (12) stop using or searching for one or more particular sources; (13) prompt a user for one or more of a response and an input; call upon an environment information database used to describe at least one aspect of the environment in an area proximate to the receiver; limit the use of at least one parameter during a period when the at least one parameter is outside an acceptable range, the start of the period identified by the change in the at least one parameter; modify the at least one parameter having the change; and identify the change in the at least one parameter and wait for a subsequent position determination before deciding whether the change is erroneous.

In some embodiments, the at least one parameter comprises altitude, and said apparatus further comprises a detector for detecting changes in clock offset between the clock of the receiver and the clock of the at least one source, and said parameter error determiner is adapted to determine if a change in at least one of altitude is to be treated as erroneous based on a detected change in clock offset.

In some embodiments, an apparatus as described herein may be included in a receiver having circuitry configured to receive signals from at least one source providing global positioning information.

According to a second aspect of the invention, there is provided a method for use in a receiver, the receiver having circuitry configured to receive signals from at least one source providing global positioning information, the method comprising: detecting a change in at least one parameter associated with the receiver; and determining if the change in the at least one parameter is to be treated as erroneous.

In some embodiments, detecting a change in at least one parameter associated with the receiver comprises detecting a change in two or more parameters; and determining if the change in the at least one parameter is to be treated as erroneous comprises determining if the change in at least two of the two or more parameters is coincident in time; and if the change in the at least two parameters is coincident in time, treating the at least two parameters as erroneous or another parameter as erroneous.

In some embodiments, the at least one parameter comprises altitude, and said method further comprises detecting changes in clock offset between a receiver clock and a clock of at least one source, and said parameter error determiner is adapted to determine if a change in altitude is to be treated as erroneous based on a detected change in clock offset.

According to a third aspect of the invention, there is provided computer readable medium having stored thereon program instructions executable by a processor of a receiver, the receiver having circuitry configured to receive signals from at least one source providing global positioning information, for causing the computing device to perform: detecting a change in at least one parameter associated with the receiver; and determining if the change in the at least one parameter is to be treated as erroneous.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Examples of embodiments of the invention will now be described with reference to the attached drawings in which.

DETAILED DESCRIPTION OF THE EMBODIMENTS OF THE INVENTION

A receiver for receiving global positioning information described herein below may be a receiver for use in a Global Navigation Satellite System (GNSS). Exemplary types of GNSS include Global Positioning System (GPS), Galileo, Global Navigation Satellite System (GLONASS), Wide Area Augmentation System (WAAS) and European Geostationary Navigation Overlay Service (EGNOS). Moreover, the use of global positioning information is not to be limited to information for only GPS, but is intended to be information generated, processed, and/or transmitted by any type of GNSS signal source, which is used for determining a position estimate. Similarly, a source of a signal, for example, a space vehicle or satellite, and the signal transmitted by such a source can be a source configured to one or more of generate, process, and transmit one or more signals for one or more of these types of GNSS.

One reason that a pseudorange determined for a signal received from a source, i.e. space vehicle (SV), at a low elevation (i.e. closer to the horizon from the perspective of the receiver) tends to suffer from multipath effects, is that the pseudorange of an SV nearer the horizon is increased due to multipath that occurs between the SV and the receiver. The pseudorange of an SV directly overhead is not increased by a substantial amount as it does not experience multipath. For example, if the SV is directly above a receiver that is located in a street of a city core in which there are tall buildings on either side of the street, the receiver will receive signals from the SV without significant multipath, as there is a direct line of sight from the SV to the receiver. However, the SV closer to the horizon may not have a direct line of sight to the receiver and the signal may reflect off of the buildings on one or both sides of the street one or more times before reaching the receiver. This will be described in further detail below with reference to FIGS. 1A and 1B.

The SV may be, for example, a satellite or some other source enabled to provide signals to a receiver used in determining a receiver position estimate.

For a standard GPS position calculation, it is the difference in the time of arrival of the different satellite signals that is important, rather than the absolute value of the arrival time. This is because the receiver's local oscillator has an offset with respect to the satellite timing signal expressed in GPS Time of Week. After an initial synchronization between the timing signal of the satellites and the receiver, the receiver clock offset continues to increase over time. In some situations the receiver clock may be occasionally reset to coincide with the GPS Time of Week and reduce the receiver clock offset to zero at that point in time. In alternative GNSS, the GPS Time of the Week is replaced with a similar type of timing signal used by the source of the global position information signal. In resolving the pseudorange measurements to derive a receiver position estimate, an estimate of the receiver local oscillator offset, (clock offset), is determined for the receiver at the time of the received signal. In the example above, the determined pseudorange estimate for the source having the low-elevation is longer than a direct path from the source at the low elevation to the receiver, whereas the determined pseudorange estimate for the source that is overhead is substantially the direct path length. When determining the receiver position, the receiver may attempt to combine the overestimated pseudorange from the low-elevation source and the substantially accurate overhead source by performing a "best fit" for both pseudorange values. The practical consequence of this, as discovered by the inventors, is that the pseudorange measurements provide a good fit to a position estimate for the receiver at a higher altitude than the true position. This higher altitude position estimate satisfies a condition of being moved comparatively closer to an overhead source than to the low-elevation sources. This will be described below in further detail with reference to FIGS. 1A and 1B. Thus, the determined position estimate, assuming the receiver is recalculating it frequently (for example, every one second is common), will undergo a sudden change in altitude, if and when an error in the position estimate is made. In some situations, if recalculation is performed less frequently, the change may not appear to be a "sudden" change. In some embodiments, a change may be determined by determining a rate of change of a parameter and comparing that to a threshold value. The extent of the change is related to the amount of multipath in the signals and the angle of elevation of the low-elevation SVs, but in some situations the size of the change is roughly equal to the average amount of multipath. A consequence of this, also discovered by the inventors, is that the calculated receiver clock offset will undergo a corresponding change.

Any change in the calculated receiver clock offset, depending on the size of the change, may be an indication of a sudden presence or absence of error in the position estimate and/or receiver clock offset determination. This change may be caused by the appearance or the disappearance of multipath signals. When the change in the receiver clock offset coincides with a change in altitude, the cause is likely to be multipath. If the change in the receiver clock offset coincides with some other parameter, such as two-dimensional position, received signal strength or Dilution of Precision (DoP), then situation-specific conclusions may be drawn and the behavior of the receiver may be altered accordingly. For example, as a result of error detected in both the altitude and receiver clock offset, a specific amount of multipath may be determined in the signals from low-elevation SV signals. The receiver may act on the conclusions that are drawn by initiating one or more of, for instance: correcting the final position estimate; searching for the weakened, direct signal; and modifying the weighting value of one or more source measurements. Modifying the weighting value of one or more source measurements may include reducing the weighting values of measurements from SVs which are determined to have multipath as compared to the weighting of measurements from SVs which have a substantially direct line of sight to the receiver.

An example of determining a position estimate that results in an improper altitude will now be described with reference to FIGS. 1A and 1B.

Figure 1A:
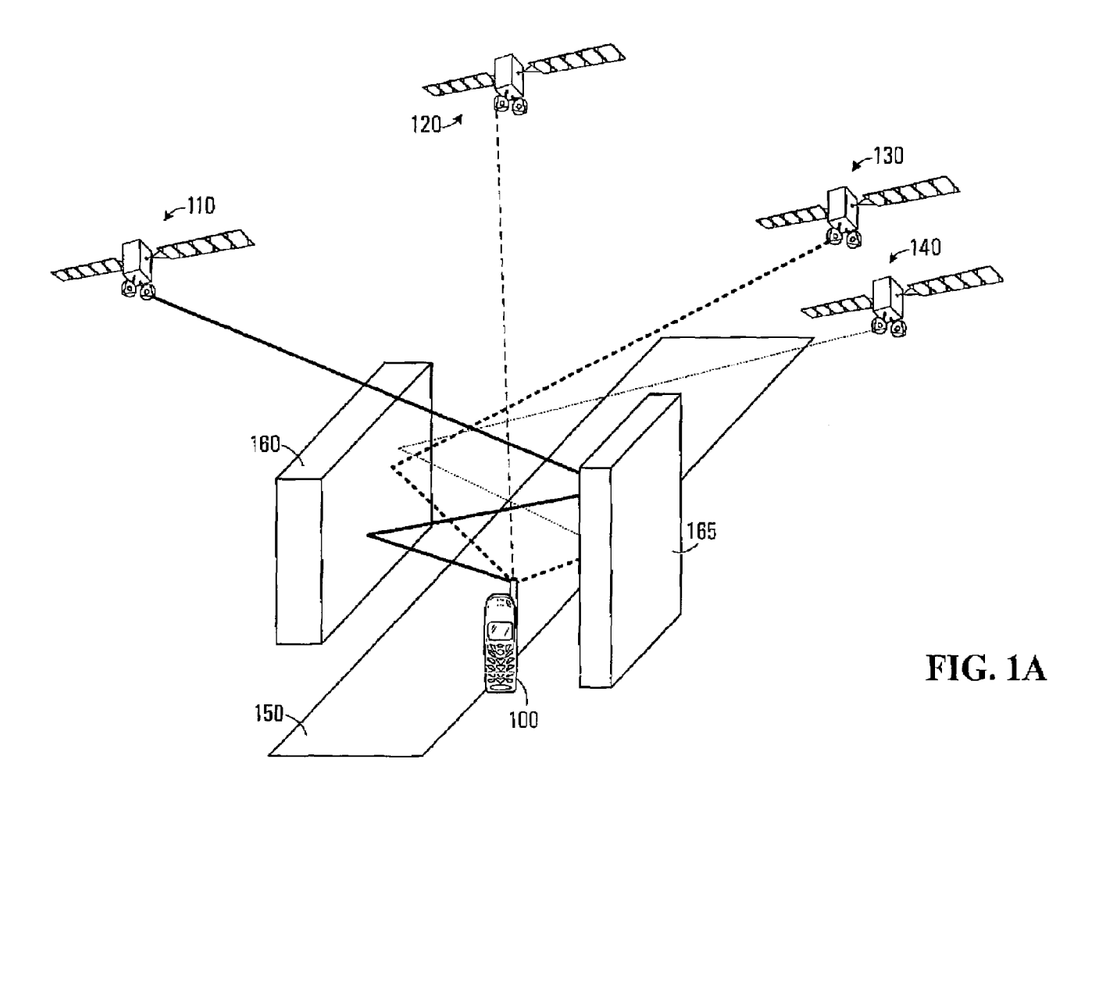
FIGS. 1A and 1B are schematic diagrams of a receiver in communication with four satellites, which transmit signals used by the receiver in determining a position of the receiver.

FIG. 1A illustrates a receiver 100 in communication with four satellites, Space Vehicle 110, Space Vehicle 120 Space Vehicle 130 and Space Vehicle 140. The receiver 100 is located on a street 150. There are buildings 160 and 165 on either side of the street 150. In the illustrated example, signals from satellites 110, 130 and 140 reflect off one or more of the buildings 160,165 at least once before reaching the receiver, causing multipath for these signals. In an environment subject to multipath signals, a determined pseudorange is longer than the actual (i.e. direct) path between the respective satellite and the receiver, due to the fact that the signal has taken a longer route. The signal from satellite 120 is in a direct line of sight with the receiver, and therefore, there is no multipath for this signal. For a standard GNSS single point solution in three dimension, four signal measurements are used. The receiver measures the difference between the ranges from itself to the satellites rather than the absolute distance. It then determines the absolute distances by finding the unique point at which the four pseudoranges meet. In resolving the position at which these four pseudoranges meet, the receiver determines the time difference, or offset, between its own local clock and GNSS time used by the satellites. In some situations, the clock offset can be used to determine the absolute distance between satellite and receiver, since it is known at the receiver what each satellite position is and when each signal was transmitted.

Figure 1B:
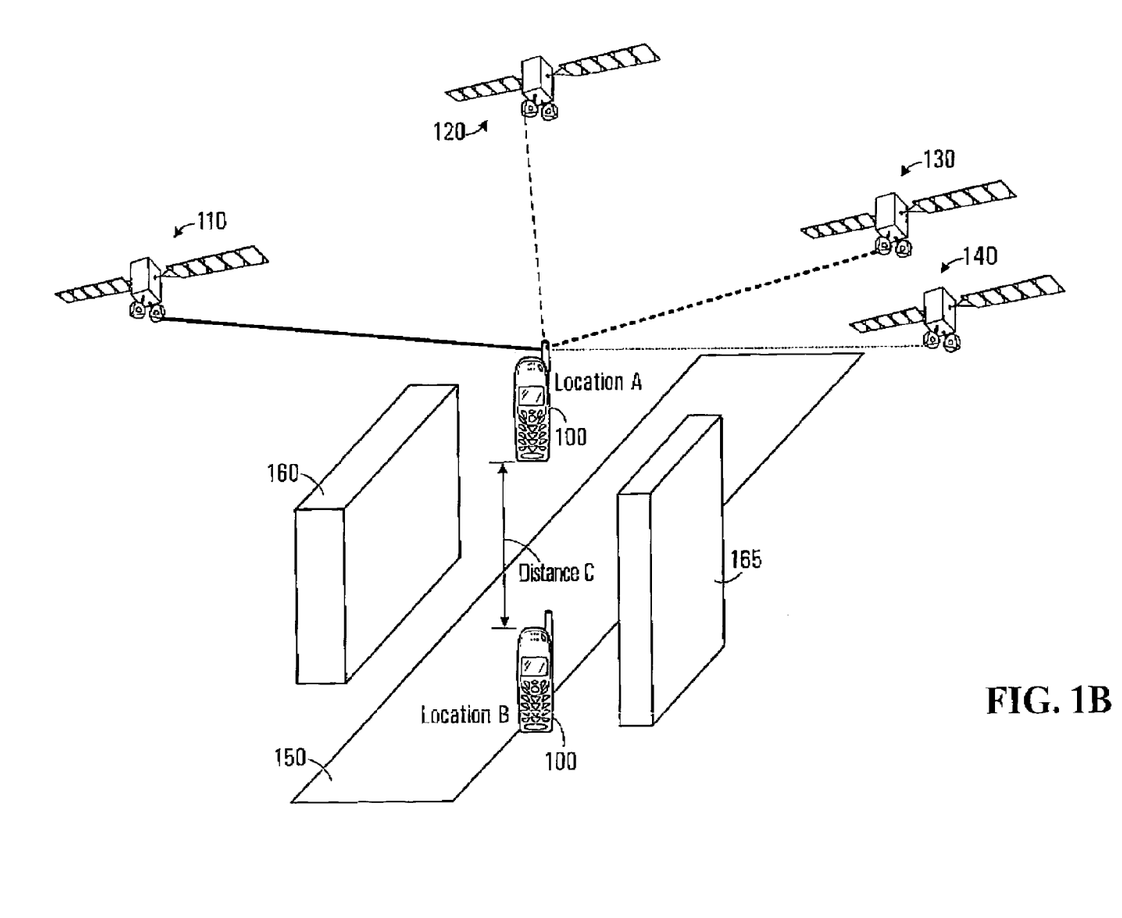

FIG. 1B illustrates a "best fit" result in determining a position estimate for the receiver 100. In attempting to compensate for the multipath shown in FIG. 1A, the receiver determines a position that is a best fit for the four signals. The actual position of the receiver 100 is indicated at Location B and the determined position is indicated at Location A. A temporal difference between the time it takes for a signal to travel from where the receiver 100 is actually located, Location B, and where the receiver 100 is determined to be located, Location A, results in a additional temporal offset of the receiver clock with regard to that of the GPS Time of Week value to which the satellites are synchronized. The temporal offset is revealed as a sudden change in the receiver clock offset approximately equal to the temporal offset required for a signal to travel between Locations A and B, indicated by Distance C, multiplied by the speed of light. In some situations, this substantially corresponds to a value of multipath (i.e. the difference, in time or distance, between the direct path and an indirect path due to multipath reflections) for one or more satellites that do not have a direct line of sight with the receiver 100. Determining the receiver clock offset may be performed by methods known to those skilled in the art.

When a receiver undergoes a genuine change in altitude, for example an increase in altitude, a similar, but subtly different phenomenon occurs. The pseudoranges from sources overhead appear to shorten compared with sources at a low elevation. Although there will be a change in altitude in the position fix, this will not correspond to a catastrophic change in the receiver clock offset, as in the multipath example above.

In some embodiments of the invention, a sudden change in a parameter associated with the receiver may be determined by comparing a detected magnitude and/or rate of change to an acceptable threshold for the magnitude and/or rate of change. In a particular example, a detected rate of change may be compared with a threshold, where the threshold is determined from environment information that includes, for example, topographical information. The topographical information may, for example, be used to create thresholds for acceptable changes in known altitude in a given region proximate to the receiver. If there are no known topographical features (a hill or a multi-story building) in an area proximate to the receiver that would result in a change in altitude from a previous measurement, and therefore, a rate of change greater than an acceptable value, a rate of change greater than this acceptable value would be an indication of a potential error in the position determined for the receiver. If there are known topographical features, for example buildings, in an area proximate to the receiver, this also may be used to predict the possibility of multipath occurring in proximity to the receiver. Such information may be taken into consideration when setting thresholds for detecting magnitude and/or rate of change. In another embodiment, the threshold may be set to an acceptable value as a function of previous measurements, for example, the threshold may be set to an "average" change, or multiple thereof, where the "average" change is an average of the changes that were determined for a given number of previous determined measurements.

Figure 2:
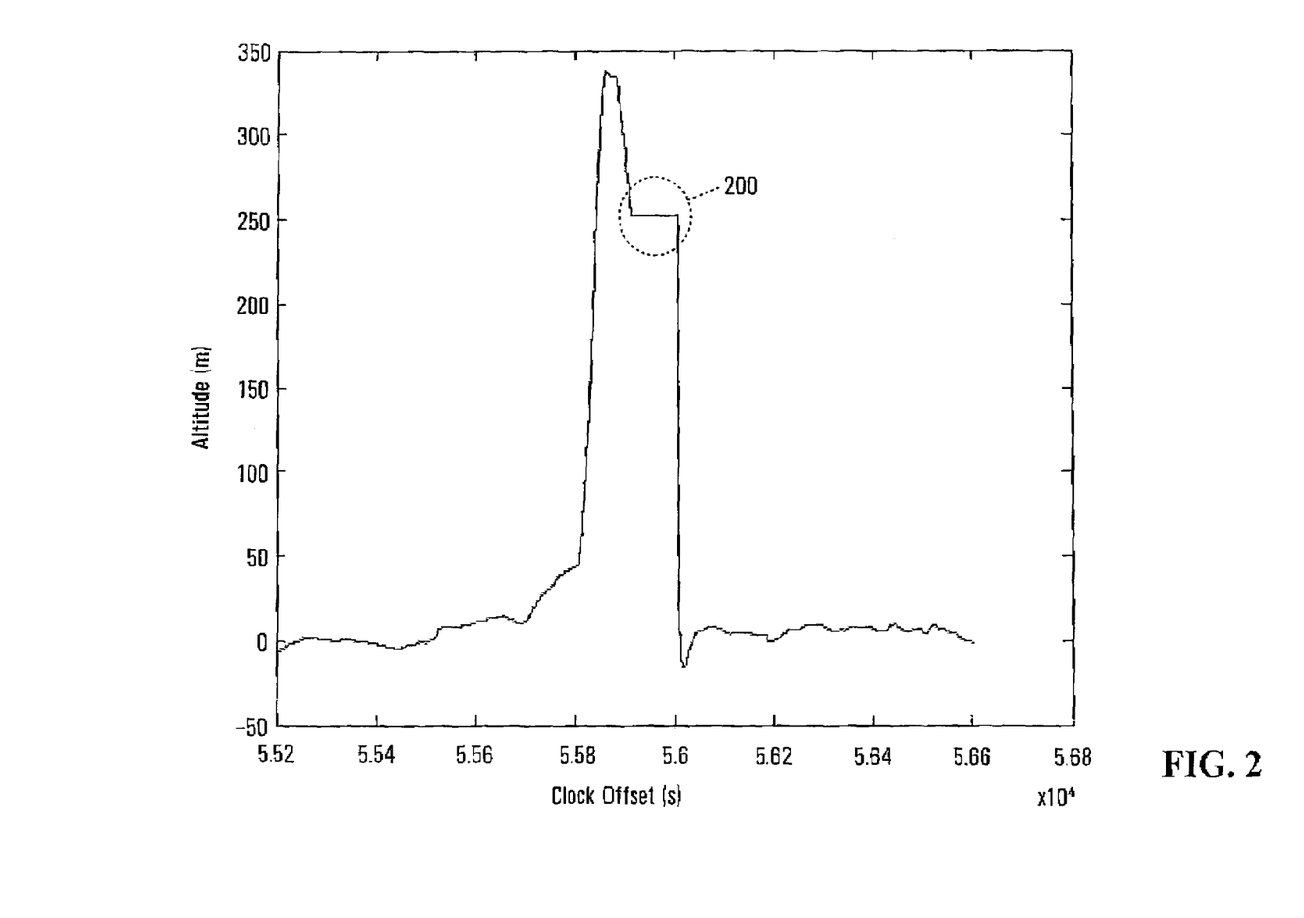
FIG. 2 is a graph that illustrates altitude of a position fix over a particular test period for a particular type of receiver.
Figure 3:
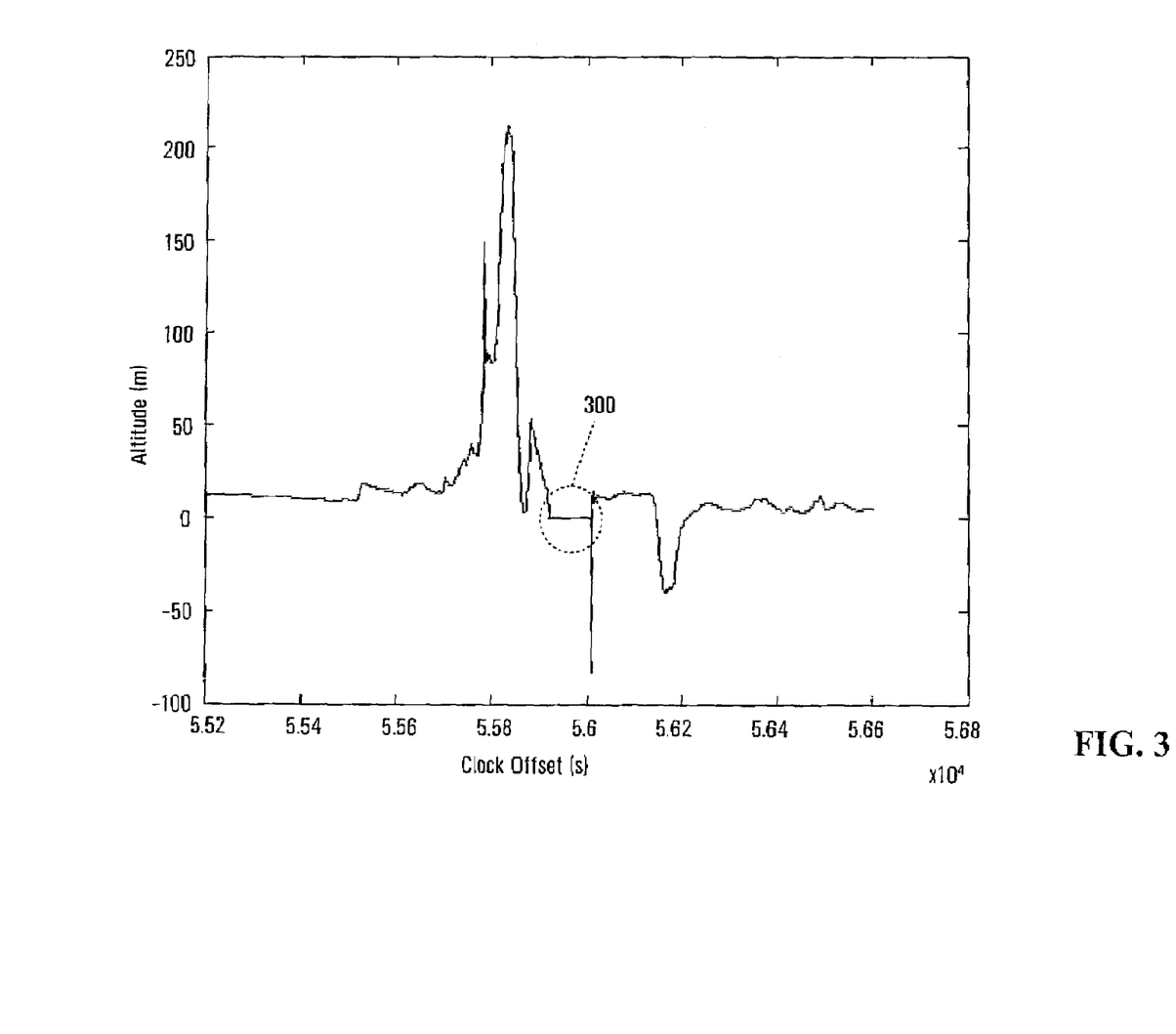
FIG. 3 is a graph that illustrates altitude of a position fix over a particular test period for a different type of receiver.

FIGS. 2 and 3 are graphical plots of receiver clock offset versus altitude determined as part of a position estimate for two different types of receiver. The plots correspond to test data in which the receivers traversed a path known to have multipath. The results in the tests show an erroneous upward leap in the altitude of the position fix. Typically, a sudden change of 200 m to 300 m was observed in the tests. In FIGS. 2 and 3, the altitude is represented on the vertical axis in units of metres (m) and the receiver clock offset is represented on the horizontal axis in units of $10^{-4}$ seconds (s).

In FIG. 2, the sudden change in altitude is illustrated by a variation ranging between approximately 10 m and approximately 340 m in a range of receiver clock offset of $5.58 \times 10^{-4}$ s to $5.60 \times 10^{-4}$ s. In FIG. 3, the sudden change in altitude is illustrated by a variation ranging between approximately −40 m and approximately 220 m in a range of receiver clock offset of $5.57 \times 10^{-4}$ s and $5.62 \times 10^{-4}$ s. A discontinuity 200, 300 in the receiver clock offset appears between approximately $5.59 \times 10^{-4}$ s and $5.60 \times 10^{-4}$ s in FIGS. 2 and 3, as a nil change in altitude during the discontinuous time duration. This is indicative of a sudden change, i.e. an increase, in the receiver clock offset of approximately $1 \times 10^{-6}$ s. As the receiver clock offset should increase at a consistent rate, based on the difference between the clock of the receiver and the time signal of the satellites at any given instant in time, the temporal discontinuity is inconsistent with such a consistent change in offset. However, it was discovered by the inventors, that the amount of the temporal discontinuity in the receiver clock offset multiplied by the speed of light, is substantially equal to the value of the sudden change in the determined altitude.

For example, based on a change in altitude of approximately 150 m, a receiver clock will appear to have drifted, or be offset, by approximately half a microsecond ($0.5 \times 10^{-6}$ s). It is noted that this corresponds to FIG. 2 in which a change in altitude of 300 m corresponds to a receiver clock offset of $1 \times 10^{-6}$ s.

A result of this observation is that changes due to multipath signals can be detected by monitoring the receiver clock offset and the reported position estimates and looking for sudden changes that occur simultaneously in these two parameters.

A similar phenomenon, but with an opposite result may occur when a position estimate is made inside a building that has a good view of a low part of the sky and sources that may be located there, but not a direct line of sight with an overhead source. In this case, the position estimate may give an erroneously low altitude.

It is of interest to note that a similar phenomenon may be observable in many different types of environments. For instance, when exiting from a covered walkway where the receiver has a good view of low-elevation SVs, but not SVs which are directly overhead. In such a case, the overhead SV signals suffer from multipath by the time they are received at the receiver. If for example the receiver has been turned on while under the covered walkway, the receiver may have an initial estimated position that has an erroneous altitude, i.e. being lower by approximately the amount of multipath in the overhead signals. As the receiver exits to an environment with a good view of the sky, the position estimate may in actuality improve, but a jump in the receiver clock offset and altitude will appear as a sudden change similar to that described in the example above. In such a situation, it is to be determined which of the measurements, before or after exit from the covered walkway, is believed to be the correct determined position.

In some embodiments, different methods can be used to help determine which of these situations is more likely, that is, which estimate represents the true altitude, the altitude before or after the identification of the sudden change. One method may include using a light sensor coupled to the receiver to aid in determining whether the receiver has access to overhead SVs or not. For example, if the light sensor only measures a small amount of light, this may be an indication that the receiver is in an enclosed space without much direct overhead light and therefore, without direct line of sight access to an overhead SV. However, if the light sensor measures a larger amount of light, this may be an indication that the receiver is out in the open and therefore, has direct line of sight access to an overhead SV. Other examples of methods that may be used to help determine whether the true altitude estimate is before or after an identified sudden change may involve using received SV signal strength or a change in received SV signal strength, map data including geographic or architectural environment information (see applicant's co-pending application no. PCT/CA2007/001519, published as publication no. WO/2008/025150, titled "An Apparatus and Method for use in Global Position Measurements"), and using the presence and/or absence of a multipath component. In some embodiments, determining whether there is most likely an error in the position estimate of the receiver is a decision that is made in the receiver.

Accordingly, some embodiments of the invention involve analysing one or more parameters measured or calculated by a GNSS receiver, identifying a sudden change in the one or more parameters and treating the one or more parameters at the occurrence of the sudden change as erroneous.

In some embodiments, if the sudden change in the at least one parameter is to be treated as erroneous, steps are then taken to initiate an action to mitigate error resulting from the sudden change. A primary error that may result from the sudden change is an incorrect position determination by the receiver.

Figure 4:
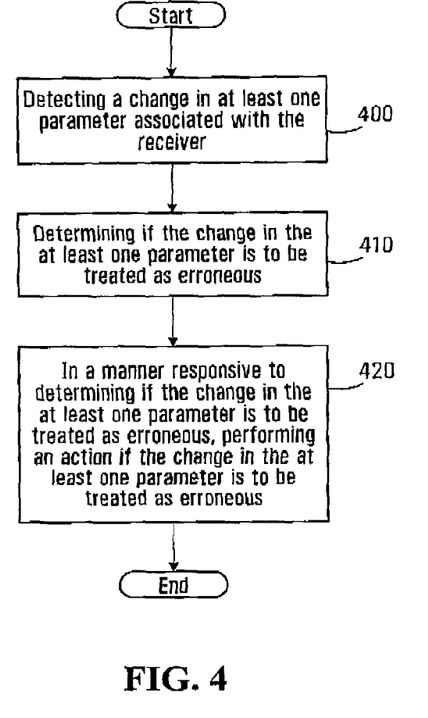
FIG. 4 is a flow chart describing a method of signal processing according to an embodiment of the invention.

An example of a method for determining a sudden change in at least one parameter will now be described with reference to the flow chart of FIG. 4.

A first step 400 of the method involves detecting a change in at least one parameter associated with the receiver. A second step 410 involves determining if the change in the at least one parameter is to be treated as erroneous. A third step 420 involves, in a manner responsive to determining if the change in the at least one parameter is to be treated as erroneous, performing an action if the change in the at least one parameter is to be treated as erroneous. Performing an action may, for example, be an action to mitigate error resulting from the sudden change. To mitigate error, the receiver may, for instance, perform any one or more of the following (which is not intended to be an exhaustive list of possibilities): altering a position determination made by the receiver, altering a parameter used in making a position determination made by the receiver, and indicating a possibility of an error to a user.

Determining if the change in the at least one parameter is to be treated as erroneous, as in step 410, may involve one or more of: performing correlation of at least one parameter having the change with environment information that describes an aspect of the environment in an area proximate to the receiver; performing correlation of at least one parameter having the change with at least one other parameter or with another value of the same parameter; and determining if the change is physically possible. For example, in the case of a detected change in a parameter, a comparison may be made with another parameter to determine if a change in the other parameter coincided with the detected change. If so, this may be used as an indication that one or both parameters, or changes in the parameters, can be treated as erroneous. This may be used as an indication that another parameter, for example, a parameter determined from the same data that was used to determine the parameters to be treated as erroneous, may be treated as erroneous.

In some embodiments, the method involves detecting a change in a parameter and characterizing that change. Based on the characterization of that change it can then be determined if the change should be treated as erroneous.

Performing an action if the change in the at least one parameter is to be treated as erroneous, as in step 420, may include at least one of the following actions: (1) searching for a direct line of sight signal based upon an estimate for an amount of multipath; (2) modifying a weighting value of a signal or discarding a signal from one or more source(s) from which the receiver is receiving a signal; (3) altering a measured pseudorange by a value corresponding to an estimated amount of multipath; (4) correcting a determined position which was determined based on the at least one parameter having the change; (5) issuing an indication of a possible position inaccuracy to a user; (6) stop using or searching for one or more particular sources; (7) prompting a user for one or more of a response and an input; (8) call upon an environment information database used to describe an aspect of the environment in an area proximate to the receiver; (9) limiting the use of at least one parameter during a period when the at least one parameter is outside of an acceptable range, the start of the period identified by the sudden change in the at least one parameter; (10) modifying the at least one parameter having the change; and (11) identifying the change in the at least one parameter and waiting for a subsequent position determination before deciding whether the change is erroneous.

Although the embodiments of the invention have been discussed above pertaining to measuring changes in altitude, changes in other parameters could be measured instead, e.g. lateral position; clock offset; GDOP (Geometric Dilution of Precision); number of satellites from which signals are received for a position measurement; pseudoranges; light intensity in an area proximate to the receiver, if the receiver is coupled with a light sensor (useful for changing operation when we have gone inside); velocity or acceleration and possibly other inertial sensors.

Figure 5:
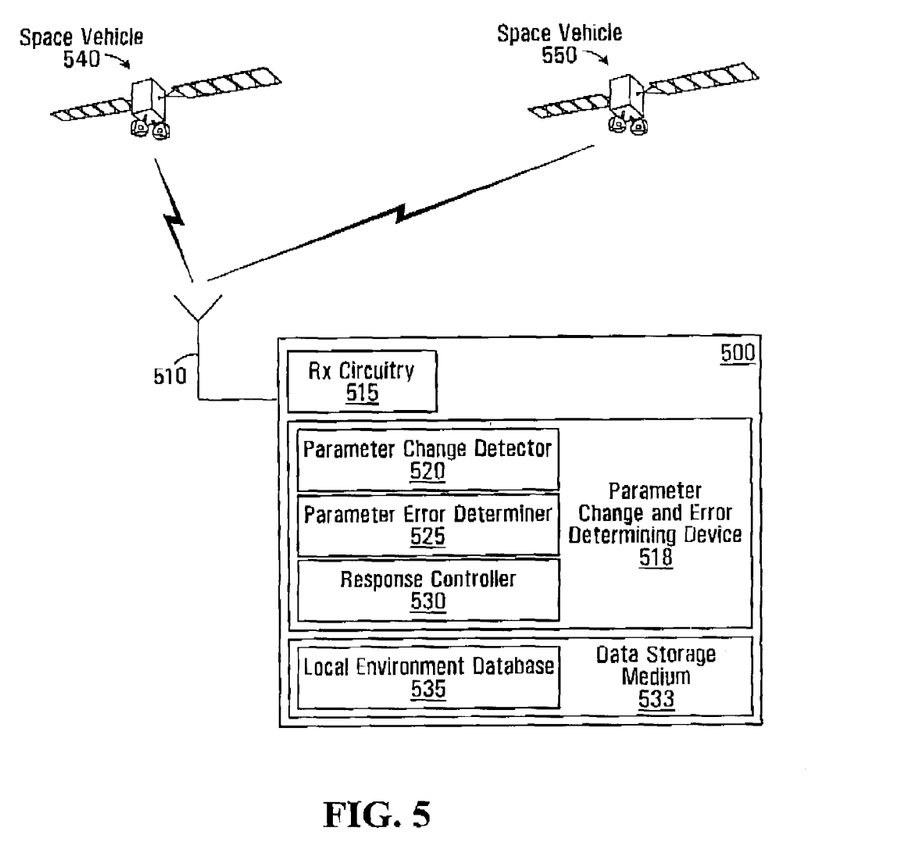
FIG. 5 is a block diagram of an example of a receiver configured to implement embodiments of the invention.

An example of a receiver according to an embodiment of the invention will now be described with reference to FIG. 5. FIG. 5 illustrates a receiver 500 in communication with two satellites, Space Vehicle 540 and Space Vehicle 550. While only two satellites are shown in communication with the receiver, it is to be understood that the receiver may be in contact with one or greater than two satellites at any given point in time.

In the illustrated example, the receiver 500 includes an antenna 510 for receiving signals from the one or more satellites. Only a single antenna is indicated in FIG. 54, but two or more antennas could be used for receiving signals from one or more satellites. The receiver 500 includes receiver circuitry 515 and a parameter change and error determining device 518. The parameter change and error determining device 518 includes a parameter change detector 520, a parameter error determiner 525, and a response controller 530. In the illustrated example, the receiver 500 includes a data storage medium 533 (e.g. a memory), for storing information that may be used to determined whether or not a value of a parameter, or a change in a parameter is to be treated as erroneous. In this embodiment, the data storage medium 533 includes an environment information database 535 that is used to define one or more aspects of the environment in an area proximate to the receiver. However, not all receivers implementing embodiments of the invention may necessarily include an environment information database.

In addition to the particular components described above as components in the receiver which are related to the invention, the receiver is considered to have other components related to the operation of the receiver, for example, transmit circuitry, hardware and/or software for acquiring and tracking satellites, and hardware and/or software for determining position estimates based on received satellite information.

In operation, the receiver circuitry 515 is configured to receive signals from the antenna from at least one source that is providing global positioning information. In some embodiments, the received signals are passed to the parameter change and error determining device 518. In some embodiments, the received signals are passed to other components of the receiver which determine one or more parameters associated with the receiver, such as, for example, hardware and/or software for determining position estimates based on received satellite information.

The parameter change and error determining device 518 is configured to receive at least one of: at least one parameter measured by or determined within the receiver and information regarding at least one aspect of the environment in an area proximate to the receiver.

In some embodiments, the parameter change detector 520 is configured to detect a sudden change in at least one parameter associated with the receiver. For example, the parameter change detector 520 evaluates parameters such as (1) a position of said receiver determined by at least one of said apparatus and said receiver; (2) a clock offset between the clock of the receiver and the clock of the at least one source; (3) velocity of said receiver; (4) acceleration of said receiver; (5) geometric dilution of precision (GDOP); (6) a number of sources from which the receiver receives signals; (7) a determined pseudorange for a signal received by said receiver; (8) the strength of a signal received by said receiver or the change in the strength of a signal received by said receiver; (9) a parameter measured by an inertial sensor; (10) a parameter indicative of the presence or absence of a multi-path component of a signal received by said receiver; (11) a parameter indicative of an aspect of the environment in an area proximate the receiver, and (12) output from a light sensor coupled to the receiver. A position of said receiver determined by at least one of said apparatus and said receiver may include one or both of a determined altitude value and a determined lateral position value. Parameters from inertial sensors may be used for determining a direction the receiver is heading; and presence/absence of a multipath component to determine if the parameters include a sudden change.

In some embodiments, a change in a parameter may be determined by applying a threshold as described above.

In some embodiments, the parameter error determiner 525 is configured to use information from the parameter change detector 520 to determine if the sudden change detected by the parameter change detector 520 is to be treated as erroneous. To determine if a detected change is to be treated as erroneous, the parameter error determiner 525 may perform correlation of at least one parameter having the sudden change with environment information that describes at least one aspect of the environment in an area proximate to the receiver, perform correlation of at least one parameter having the sudden change with at least one other parameter or with another value of the same parameter, and/or may determine if the sudden change is physically possible. Correlation may be performed with another value of the same parameter in a situation where a parameter determined to have experienced a sudden change is correlated with the same parameter at a time before the change was determined or at a time subsequent to the when the change was determined.

The response controller 530 is configured to control a response of the receiver if the sudden change in the at least one parameter is to be treated as erroneous. The response controller may initiate one or more one of the following actions: (1) searching for a direct line of sight signal; (2) modifying (e.g. reduce or increase) a weighting value of a signal or discard a signal from one or more sources from which the receiver is receives a signal; (3) altering a measured pseudorange by a value corresponding to an estimated amount of multipath; (4) altering a measured pseudorange based on an estimated amount of multi-path; (5) providing an indication of the presence of one or more multi-path component(s) of signal(s); (6) one or more of predicting, estimating, determining and providing an indication of the magnitude of one or more multi-path component(s) of signal(s); (7) one or more of detecting, determining and providing an indication of information on the environment local to the receiver; (8) correcting a determined position which was determined based on the at least one parameter having the change; (9) providing an indication of a possible position inaccuracy to a user; (10) one or more of determining and providing an indication of the magnitude of an error in one or more parameters; (11) one or more of controlling and modifying a strategy for one or more of acquiring and tracking signal(s) transmitted from one or more sources; (12) stopping using or searching for one or more particular sources; (13) prompting a user for one or more of a response and an input; (14) calling upon an environment information database used to describe at least one aspect of the environment in an area proximate to the receiver; (15) limiting the use of at least one parameter during a period when the at least one parameter is outside of an acceptable range, the start of the period identified by the change in the at least one parameter; (16) modifying the at least one parameter having the change; and (17) identifying the change in the at least one parameter and waiting for a subsequent position determination before deciding whether the change is erroneous.

The environment information database 535 may include for example architectural environment information and/or geographical environment information. Information regarding an area proximate to the receiver can be determined from the environment information database 535. The environment information database 535 may be stored on a computer readable medium and be accessible by other hardware and/or software components of the receiver 500. For example, the parameter error determiner 525, may access the environment information database 535 to perform correlation of the sudden change with information about the local environment proximate to the receiver. In some embodiments, the environment information database 535 is not collocated with the receiver 500, but the receiver is configured to access a remote source to obtain environment information in an area proximate to the receiver. In some embodiments, the receiver 500 may have a environment information database 535 collocated with the receiver, but may augment the content of the collocated environment information by accessing a remote source of additional environment information for an area proximate to the receiver.

The parameter change and error determining device may be physically implemented using software, hardware, firmware or any combination thereof. For example, a hardware implementation may include using application specific integrated circuits (ASIC), field programmable gate arrays (FPGA), other implementations known to those in the art, or combinations thereof. To implement the functional components in software, in some embodiments a microprocessor capable of performing basic digital signal processing operations is utilized to implement the various functionalities of the parameter change and error determining device.

In another embodiment of the invention, a method is provided for using information that indicates a determined change in at least one parameter to predict the presence and magnitude of multipath components of one or more signals that are received by the receiver. For example, the method may involve the receiver detecting a change in at least one parameter associated with the receiver. This may include any of the parameters described above, for example altitude and receiver time offset. In a manner responsive to the change detected in at least one parameter, the receiver may use that information to perform one or more of: (1) predicting, (2) estimating, (3) determining and (4) providing an indication of the magnitude of one or more multi-path component(s) of signal(s). The change in the at least one parameter and/or other information, such at the determined pseudorange and/or other information received from the satellite transmitting the signal may be used for predicting, estimating, determining and/or providing an indication of the magnitude of one or more multi-path component(s) of a signal.

Numerous modifications and variations of the present invention are possible in light of the above teachings. It is therefore to be understood that within the scope of the appended claims, the invention may be practiced otherwise than as specifically described herein.

The invention claimed is:

1. An apparatus for a receiver configured to determine position based at least in part on global positioning information, the apparatus comprising:
   receiver circuitry associated with a receiver and configured to receive a signal from at least one source providing global positioning information;
   a parameter change detector configured to detect changes in a determined position of the receiver and a clock offset between a clock associated with the receiver and a clock associated with the at least one source; and
   a parameter error determiner configured to determine if the change in the determined position is to be treated as erroneous when the changes in the determined position and the clock offset are sudden and coincident.

2. The apparatus of claim 1 wherein said parameter change detector is further configured to detect sudden changes.

3. The apparatus of claim 1 wherein said parameter error determiner is further configured to determine if the change in the determined position is to be treated as erroneous based on at least one of a magnitude of each change and each rate of change.

4. The apparatus of claim 1 wherein said parameter error determiner is further configured to determine if the change in the determined position is to be treated as erroneous based on further information.

5. The apparatus of claim 4 further comprising at least one of an input coupled to said parameter error determiner for receiving said further information and a generator configured to generate said further information.

6. The apparatus of claim 4 wherein said further information includes at least one of:
   a measurement of at least one of the determined position and the clock offset at a different time to the detected change;
   a value for at least one of the determined position and the clock offset;
   a threshold change in the value of at least one of the determined position and the clock offset;
   a measurement of a different parameter at substantially the coincident time as the detected changes, or at a different time; and
   information indicative of one or more aspects of an environment in an area proximate the receiver, when the apparatus is in use.

7. The apparatus of claim 6 wherein said different parameter includes anyone of:
   velocity of said receiver;
   acceleration of said receiver;
   geometric dilution of precision (GDOP);
   a number of sources from which the receiver receives signals;
   a determined pseudorange for the signal received by said receiver;
   strength of the signal received by said receiver;
   a parameter measured by an inertial sensor;
   a parameter indicative of the presence or absence of a multi-path component of the signal received by said receiver; and
   information indicative of the one or more aspects of the environment in the area proximate the receiver.

8. The apparatus of claim 1 wherein said determined position includes at least one of altitude and lateral position.

9. The apparatus of claim 6 wherein said information indicative of the one or more aspects of the environment includes at least one of information derived from a light sensor co-located with the receiver, architectural environment information, and geographical environment information.

10. The apparatus of claim 1 wherein said parameter change detector is further configured to detect a change in at least one of:
    velocity of said receiver;
    acceleration of said receiver;
    geometric dilution of precision (GDOP);
    a number of sources from which the receiver receives signals;
    a determined pseudorange for the signal received by said receiver;
    strength of the signal received by said receiver;
    a parameter measured by an inertial sensor;
    a parameter indicative of a presence or an absence of a multi-path component of the signal received by said receiver; and
    a parameter indicative of an aspect of an environment in an area proximate the receiver.

11. The apparatus of claim 1 wherein said parameter error determiner is configured to determine if the change in the determined position is physically possible.

12. The apparatus of claim 1 further comprising a response controller responsive to said parameter error determiner and configured to cause an action if the change in the determined position is to be treated as erroneous.

13. The apparatus of claim 12 wherein the action includes at least one of:
    searching for a direct line of sight signal;
    modifying a weighting value of a signal or discarding a signal from one or more sources from which the receiver receives a signal;
    altering a measured pseudorange;
    altering the measured pseudorange based on an estimated amount of multi-path;
    providing an indication of a presence of one or more multi-path components of signals;
    one or more of predicting, estimating, determining and providing an indication of a magnitude of the one or more multi-path components of signals;
    one or more of detecting, determining and providing an indication of information on an environment local to the receiver;
    correcting the determined position;
    providing an indication of a possible position inaccuracy to a user;
    one or more of determining and providing an indication of a magnitude of an error in one or more parameters;
    one or more of controlling and modifying a strategy for one or more of acquiring and tracking signals transmitted from one or more sources;
    stopping using or searching for one or more particular sources;
    prompting the user for one or more of a response and an input;
    calling upon an environment information database used to describe at least one aspect of an environment in an area proximate to the receiver;
    limiting the use of at least one of the determined position and the clock offset during a period when the at least one of the changes of the determined position and the clock offset is outside an acceptable range;
    modifying the at least one of the determined position and clock offset; and
    identifying the change in at least one of the determined position and the clock offset and waiting for a subsequent position determination before deciding whether the changes are erroneous.

14. The apparatus of claim 12 wherein the action is performed to mitigate error resulting from the change in the determined position.

15. The apparatus of claim 1 wherein said determined position includes altitude, said parameter error determiner being further configured to determine if a change in altitude is to be treated as erroneous based on a detected change in clock offset.

16. A receiver including the apparatus as claimed in claim 1.

17. The apparatus of claim 3 wherein said parameter error determiner is further configured to determine if the change in the determined position is to be treated as erroneous based on at least one of comparing the magnitude of each change to a magnitude threshold, and comparing each rate of change to a rate threshold.

18. A method for use in a receiver configured to determine position based at least in part on global positioning information, the method comprising:
   receiving a signal from at least one source providing global positioning information;
   detecting changes in a determined position of a receiver and a clock offset between a clock associated with the receiver and a clock associated with the at least one source; and
   determining if the change in the determined position is to be treated as erroneous when the changes in the determined position and the clock offset are sudden and coincident.

19. The method of claim 18 wherein detecting changes includes detecting sudden changes.

20. The method of claim 18 wherein determining if the change in the determined position is to be treated as erroneous is based on at least one of a magnitude of each change and a rate of each change.

21. The method of claim 18 further comprising detecting a change in at least one of:
   velocity of said receiver;
   acceleration of said receiver;
   geometric dilution of precision (GDOP);
   a number of sources from which the receiver receives signals;
   a determined pseudorange for the signal received by said receiver;
   strength of the signal received by said receiver;
   a parameter measured by an inertial sensor;
   a parameter indicative of a presence or an absence of a multi-path component of the signal received by said receiver; and
   a parameter indicative of an aspect of an environment in an area proximate the receiver.

22. The method of claim 18 wherein said determined position includes at least one of altitude and lateral position.

23. The method of claim 18 wherein determining if the change in the determined position is to be treated as erroneous includes determining if the change in the determined position is physically possible.

24. The method of claim 18 further comprising performing an action if the change in the at determined position is to be treated as erroneous.

25. The method of claim 24 wherein the action includes at least one of:
   searching for a direct line of sight signal;
   modifying a weighting value of a signal or discarding a signal from one or more sources from which the receiver receives a signal;
   altering a measured pseudorange;
   altering the measured pseudorange based on an estimated amount of multi-path;
   providing an indication of a presence of one or more multi-path components of signals;
   one or more of predicting, estimating, determining and providing an indication of a magnitude of the one or more multi-path components of signals;
   one or more of detecting, determining and providing an indication of information on an environment local to the receiver;
   correcting the determined position;
   providing an indication of a possible position inaccuracy to a user;
   one or more of determining and providing an indication of a magnitude of an error in one or more parameters;
   one or more of controlling and modifying a strategy for one or more of acquiring and tracking signals transmitted from one or more sources;
   stopping using or searching for one or more particular sources;
   prompting the user for one or more of a response and an input;
   calling upon an environment information database used to describe at least one aspect of an environment in an area proximate to the receiver;
   limiting use of at least one of the determined parameter and the clock offset during a period when the at least one of the changes of the determined position and the clock offset is outside an acceptable range;
   modifying at least one of the determined position and the clock offset; and
   identifying the change in at least one of the determined position and the clock offset and waiting for a subsequent position determination before deciding whether the changes are erroneous.

26. The method of claim 18 further comprising, if the changes in the determined position and the clock offset are coincident in time, treating at least one of the determined position and the clock offset as erroneous or another parameter as erroneous.

* * * * *

UNITED STATES PATENT AND TRADEMARK OFFICE
CERTIFICATE OF CORRECTION

Page 1 of 1

PATENT NO. : 8,400,353 B2
APPLICATION NO. : 12/310551
DATED : March 19, 2013
INVENTOR(S) : Tarlow It is certified that error appears in the above-identified patent and that said Letters Patent is hereby corrected as shown below:

On the Title Page

Page 1 (item 75, Inventor) at line 1, Change "London (GB)" for Ben Tarlow to --Cottenham (GB)--.

Page 1 (item 73, Assignee) at line 2, Change "(GB)" to --Hertfordshire (GB)--.

In the Specification

In column 6 at line 18, Change "dimension," to --dimensions,--.

In column 10 at line 15, Change "determined" to --determine--.

In column 10 at line 48, Change "as" to --as:--.

In column 12 at line 39, Change "at" to --as--.

In the Claims

In column 13 at line 25, In Claim 6, change "receiver," to --receiver--.

In column 14 at line 46, In Claim 13, change "the at" to --at--.

Signed and Sealed this
Thirty-first Day of March, 2015

Michelle K. Lee
*Director of the United States Patent and Trademark Office*